Patented Oct. 21, 1952

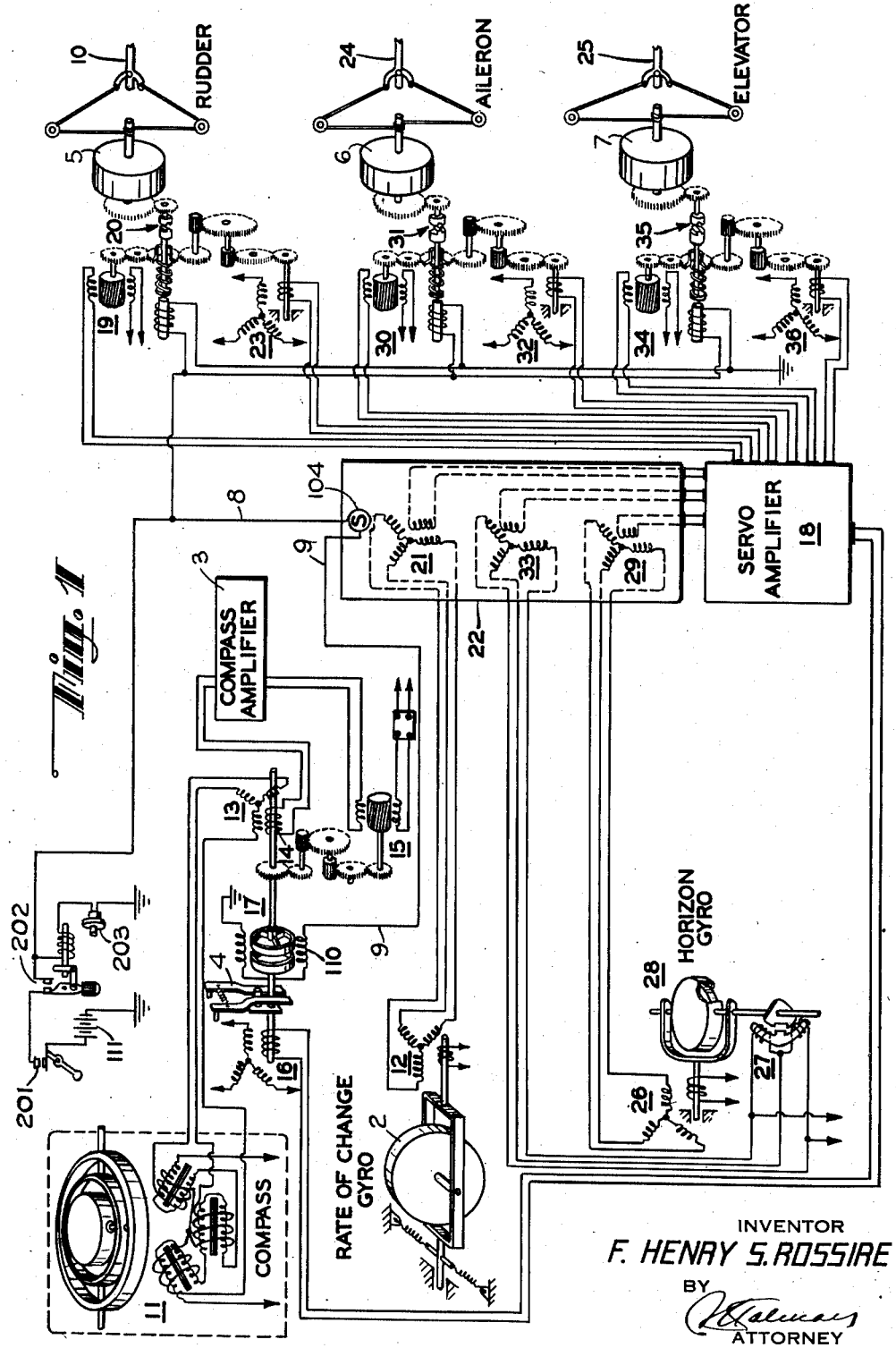

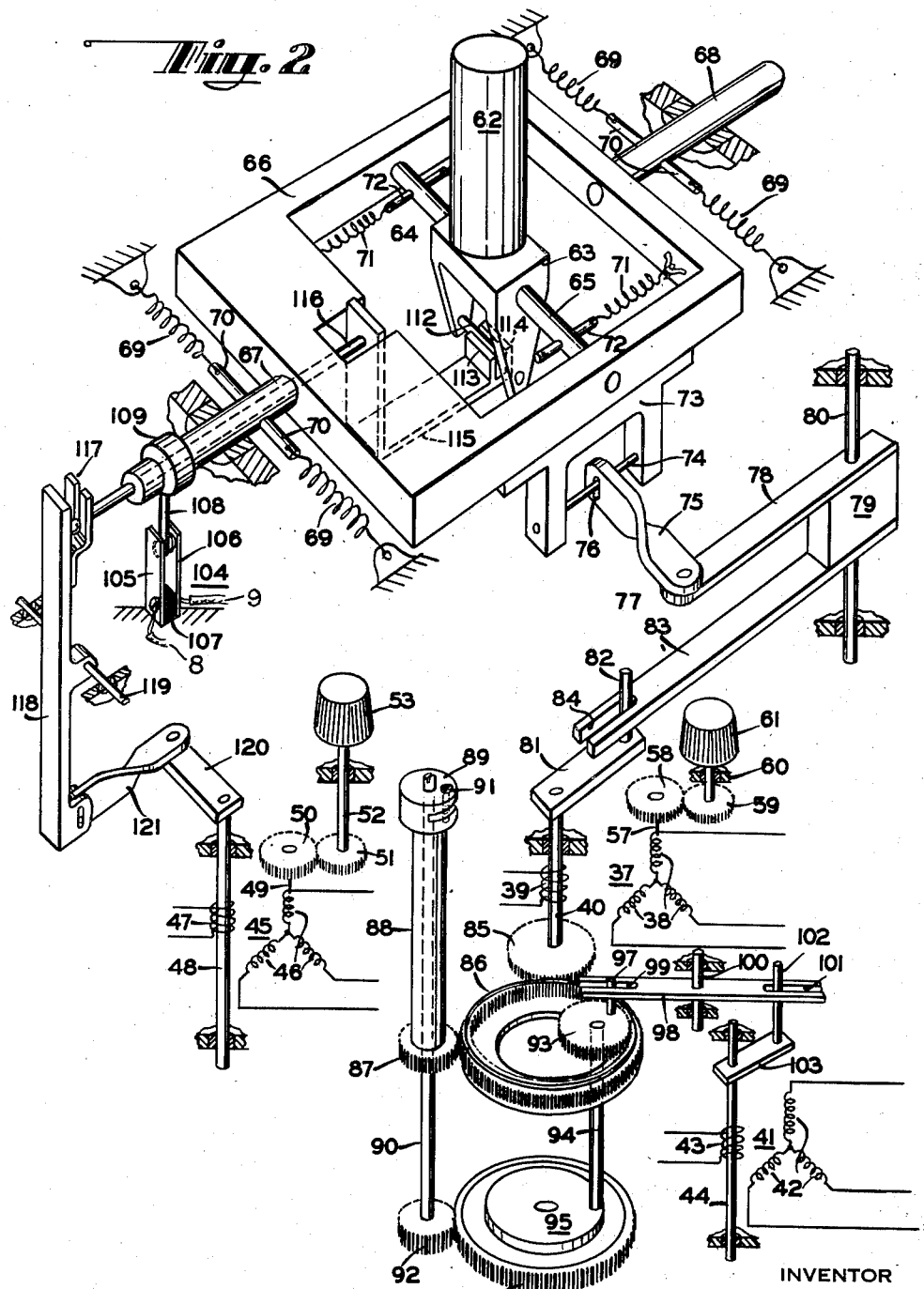

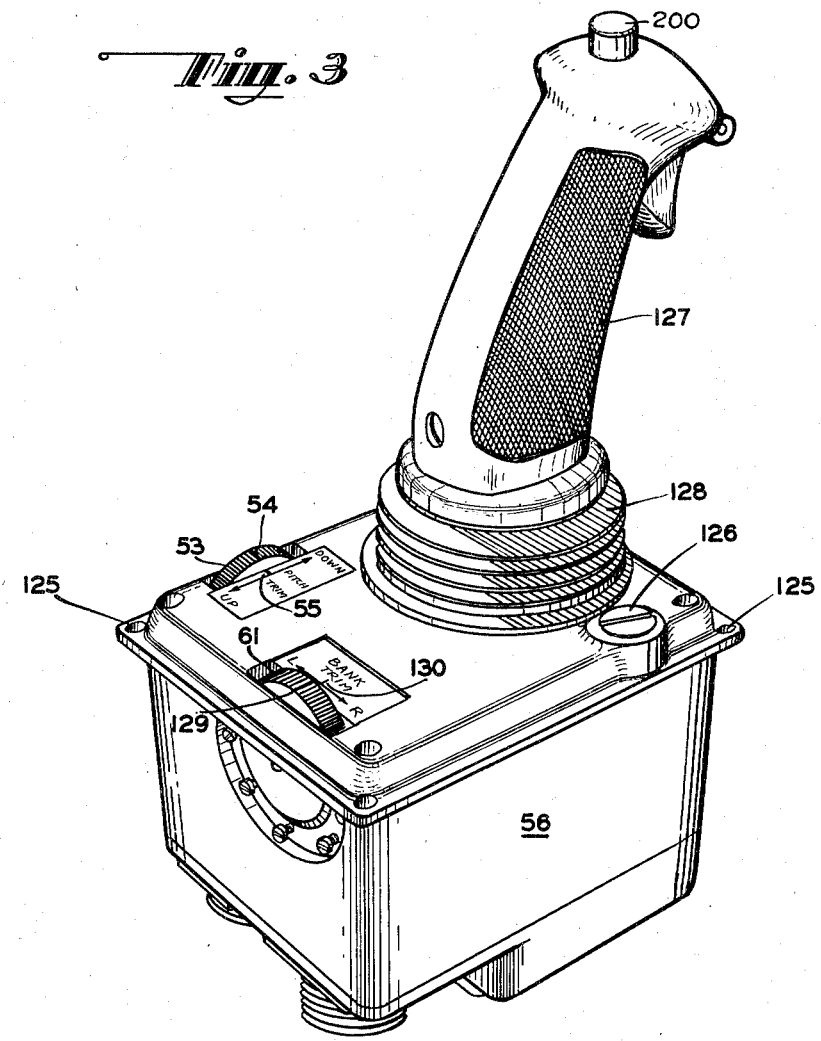

2,614,776

UNITED STATES PATENT OFFICE 2,614,776

FLIGHT CONTROLLER FOR AUTOMATIC PILOT

Francis Henry S. Rossire, Leonia, N. J., assignor to Bendix Aviation Corporation, Teterboro, N. J., a corporation of Delaware Application February 17, 1947, Serial No. 729,019

6 Claims. (Cl. 244—77)

This invention relates generally to automatic pilot or steering systems for mobile craft and more particularly to novel automatic trim and/or turn provision therefor and as such constitutes an improvement over the automatic trim and/or turn control unit of copending application Serial No. 604,861, filed July 13, 1945, which issued as Pat. No. 2,516,641 on July 25, 1950.

In commercial flights and especially in flights of a military character where automatic steering systems are utilized it is essential that changes in the direction and attitude of an aircraft may be brought about rapidly and with a minimum of required manual operations. In military maneuvers particularly where split second operation is required, it is undesirable to be confronted with a series of separate control members whose selective operation is required to bring about a change in direction and attitude. Obviously, therefore, it is important to be able to make the desired maneuvers such as bank, turn, climb or dive, for example, by the manipulation of but a single operating means or handle.

Automatic turn control units for automatic steering systems for aircraft have been provided whereby in response to manual manipulations thereof artificial signals are developed thereby independently of the master instruments to automatically change the direction of flight. With known devices, however, once the called for amount of change in direction was derived the unit had to be operated manually to a central position at which time the automatic pilot again assumed primary control of the craft. It is, therefore, highly desirable to provide a controller of a character such that once the required change in direction called for by it has been accomplished it be returned to its neutral or central position automatically without a manual centering operation.

Moreover, for dynamic rapidly moving bodies such as aircraft, it is essential that there be an immediate response of the related control surfaces to the initiating signal or signals. In order to transmit the initiating signal whereby substantially immediate response of the control surfaces may be obtained, the controller unit must be direct acting with a minimum of parts so that lost motion and the time lag resulting therefrom may be reduced to a minimum. The flight controller unit of the aforementioned application relied on gear systems to transmit the applied forces to related signal generators thereby introducing lost motions inherent in such systems. The novel control unit of the present invention, on the other hand, is designed to eliminate the use of gear systems thereby overcoming the drawbacks of such systems.

An object of the present invention, therefore, is to provide a novel, improved and simplified control unit for automatic steering systems for mobile craft.

Another object of the present invention is to provide a novel control unit for automatic steering systems for aircraft whereby in response to the manipulation of but a single controlling means or handle automatic turns and/or changes in attitude may be obtained.

A further object of the invention is to provide a novel, improved and simplified controller unit for automatic pilot systems for aircraft whereby smoother craft flight control is provided thereby than that available heretofore.

Another object is to provide a novel controller unit for automatic steering systems for mobile craft whereby the amount of gearing heretofore required in such units has been reduced to a minimum eliminating the drawbacks inherent in known systems and thereby providing a unit with the use of which more rapid response is derived on the part of the control surfaces upon manipulation of the unit.

A further object is to provide a novel control unit for automatic steering systems for aircraft whose controlling element is adapted for automatically returning to its neutral or central position when the controlling force applied thereto has been removed therefrom.

Another object of the present invention is to provide a novel controller unit for automatic piloting systems for aircraft with the use of which the safety factor in the flying of aircraft will be increased.

The above and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only, and are not to be construed as defining the limits of the invention.

In the drawings wherein like reference characters refer to like parts throughout the several views:

Figure 1 is a diagrammatic illustration of an automatic steering system for mobile craft embodying the novel automatic trim and/or turn control unit of the present invention;

Figure 2 is a detailed schematic illustration of the novel trim and/or turn control unit of the present invention; and, Figure 3 is a perspective front elevational view of one practical embodiment of the control panel for operating the automatic trim and/or turn mechanism.

Referring now to the drawings for a more detailed description of the present invention, the controller unit thereof is illustrated as embodied in an all electric automatic pilot providing three axes of control of the character shown and described in copending applications Serial No. 516,488, filed December 31, 1943, and Serial No. 516,489, filed December 31, 1943.

As more fully described in the latter application, the control of a rudder 10, as shown in Figure 1, is derived from a gyro stabilized earth inductor type compass 11 and a pick-off 12 operated from a two-degree-of-freedom rate gyro 2. The compass includes an inductive coupling device 13 having an angularly movable rotor 14, a motor 15 for displacing rotor 14, a compass signal transmitter 16 and a magnetic clutch 17 for coupling rotor 14 with the signal transmitter under certain conditions. The signal of rotor 14 is amplified within compass amplifier 3 for operating motor 15. A suitable centering device, designated generally with the reference character 4, is provided between transmitter 16 and clutch 17 so that upon de-energization of clutch 17 the transmitter will be centered. The compass signal transmitter is connected with the rudder channel of an amplifier 18, the output of which energizes a motor 19 connected to the rudder through a clutch 20. The rate signal of pick-off 12 is also impressed on the rudder channel of the amplifier through an inductive rate receiver device 21 within the novel controller unit of the present invention, generally designated with the reference character 22, to be more fully described hereinafter. Operation of rudder motor 19 displaces rudder 10 through a speed reduction gear system 5 and also an inductive follow-up device 23 developing in the latter a follow-up signal which is impressed on the rudder channel of the amplifier to be mixed with the displacement and rate signals.

Signals for operating aileron and elevator surfaces 24 and 25, on the other hand, are developed by bank and pitch take-offs 26 and 27 arranged about the bank and pitch axes of an artificial horizon gyro 28. As a result of a banked condition, take-off 26 develops a bank signal which is communicated to the input of the aileron channel of amplifier 18 through an inductive bank receiver device 29, located within unit 22, the output of the channel being connected to energize a motor 30 which connects through a clutch 31 and a speed reduction gear system 6 with aileron surface 24. Operation of motor 30 displaces an inductive follow-up device 32 developing a follow-up signal therein which is impressed on the bank signal in the amplifier to modify operation of motor 30. In a similar manner, as a result of a pitch condition, take-off 27 develops a pitch signal which is communicated to the input of the elevator channel of amplifier 18 through an inductive pitch receiver device 33, likewise located within unit 22, the output of the pitch channel being connected to energize a motor 34 which connects through a clutch 35 and a speed reduction gear system 7 with elevator surface 25, operation of the motor displacing an inductive follow-up device 36 developing a follow-up signal therein which is impressed on the pitch signal in the amplifier to modify operation of motor 34.

Coming now to the novel automatic control mechanism and the novel controller unit therefor constituting the subject matter of the present invention, the former is shown schematically in Figure 2 of the drawings as embodying an inductive bank device 37 (corresponding to receiver 29 of Figure 1) having a wound stator 38 and an inductively coupled rotor 39 carried by a shaft 40, an inductive rate device 41 (corresponding to receiver 21 of Figure 1) having a wound stator 42 and an inductively coupled rotor 43 carried by a shaft 44 and an inductive pitch device 45 (corresponding to receiver 33 of Figure 1) having a wound stator 46 and an inductively coupled rotor 47 carried by a shaft 48.

Stator 46 of the inductive pitch receiver device is mounted for angular motion relative to its rotor 47 by means of a tubular shaft 49 which connects through a suitable gear 50 with a pinion 51 mounted on a shaft 52 carrying a pitch trim knob 53 thereon. With the automatic pilot engaged, the craft may be forced into a climb by operating pitch trim knob 53 whereby stator 46 is displaced relative to rotor 47 destroying the condition of electrical equilibrium normally existing between the transmitter stator of pitch take-off 27 (Figure 1) and the receiver stator 46 (corresponding to the stator of receiver 33 of Figure 1) so that a pitch signal potential is induced within rotor 47 even though, at that moment, take-off 27 does not call for elevator control. The signal of rotor 47 is fed to the elevator channel of amplifier 18 to deflect elevator and provide craft climb. The craft will be maintained in the climb until knob 53 is returned to its neutral position. This latter position is one in which as shown in Figure 3 of the drawings, an index 54 carried by knob 53 will coincide with a fixed marker 55 carried by the housing 56 of the novel controller unit of the present invention. To force the craft into a dive, on the other hand, knob 53 is operated in a reverse direction to reverse movement of stator 46 whereby the pitch signal potential induced within rotor 47 is reversed to thereby reverse operation of the elevator servo motor 34.

The inductive bank receiver device 37 has its stator 38 mounted for angular motion relative to rotor 39 by means of a tubular shaft 57 which connects through a suitable gear 58 with a pinion 59 mounted on a shaft 60 carrying a bank trim knob 61 thereon. For unequal loading conditions, or for a condition where for some reason or another the condition of electrical equilibrium normally existing between the stator of the transmitter of bank device take-off 26 (Figure 1) and the stator 38 (corresponding to the stator of bank receiver 29 of Figure 1) has been destroyed, bank trim knob 61 may be operated to angularly displace stator 38 in one direction or another relative to rotor 39 until the condition of balance has been re-established.

By means of the novel controller unit of the present invention, all that need be done by the human pilot to place a craft provided with the all electric automatic pilot hereinabove generally described, into an automatic turn is to merely displace a handle 62 in the direction desired. Handle 62 is supported by means of a bracket 63 (Figure 2) on inner trunnions 64 and 65 for movement about a horizontal axis within a gimbal ring 66, the latter being mounted by way of outer trunnions 67 and 68 for movement about a second horizontal axis perpendicular to the first axis defined by trunnions 64—65. Handle 62, moreover, is so arranged that the outer trunnions 67—68 are parallel with the fore and aft axis of the craft to thereby define the bank axis while inner trunnions 64—65 are parallel with the craft's transverse axis to thereby define the pitch axis. Resilient members 69, anchored at their outer ends and fixed to outer trunnions 67—68 by way of connecting pins 70, yieldably restrain motion of handle 62 about the craft fore and aft axis and resilient members 71, anchored at their outer ends and fixed to inner trunnions 64, 65 by way of connecting pins 72, yieldably restrain movement of handle 62 about the transverse axis of the craft so that handle 62 is returned automatically to its neutral or central position whenever a displacing force applied thereto has been released therefrom.

With the arrangement thus far described, it will be obvious that displacement of handle 62 in a direction either right or left of the craft fore and aft axis produces an angular displacement of gimbal 66 about an axis defined by the outer trunnions while a displacement of the handle in a direction either right or left of the craft's transverse axis produces an angular displacement of the handle about an axis defined by the inner trunnions. Displacement of the handle, on the other hand, in a direction other than a right or left direction of the fore and aft axis or the transverse axis produces an angular displacement of the handle about an axis defined by the inner trunnions as well as an angular displacement of gimbal ring 66 about an axis defined by the outer trunnions. Thus, handle 62 is capable of universal motion whereby displacement of the handle in any direction is resolved into two horizontal components perpendicular to each other, one being a displacement perpendicular to the fore and aft axis of the craft and the other being a displacement perpendicular to the craft transverse axis. The direction and amount of displacement of the handle, therefore, determines the magnitude of the horizontal components into which the displacement is resolved.

Attached to gimbal ring 66 is a bracket 73 supporting a rod 74 between its spaced ends which engages a link 75 by way of a slot 76 formed in the latter, the link 75 being connected by way of a pin 77 to one arm 78 of a crank 79 mounted for pivotal motion by way of a shaft 80. Rotor supporting shaft 40 of the inductive bank device 37 supports at one of its ends a bracket 81 provided with a pin 82 which engages a second arm 83 of crank 79 by way of a slot 84 formed in the latter arm for that purpose. The opposite end of shaft 40 has secured thereto a gear 85 which meshes with a gear 86, the outer toothed periphery of which engages a gear 87 attached to a hub 88 of a locking device 89 sleeved on a shaft 90 which is normally locked by means of a screw 91 to device 89 whereby gear 87 and a gear 92 attached to the lower end of shaft 90 move in unison. This latter arrangement constitutes an airspeed adjustment linkage.

Gear 86 is further provided with a toothed inner periphery for engagement with a gear 93 secured to a shaft 94 whose free end is fixed through a disc 95 to a gear 96 meshing with gear 92. Gear 93, on the other hand, supports near its periphery a pin 97 through which it engages a lever 98 by way of a suitable slot 99, the lever being mounted for pivotal motion by way of a shaft 100. The opposite end of the lever is provided with a slot 101 for connection to rotor supporting shaft 44 of the inductive rate device 41 through a pin 102 and a bracket 103.

The component of the displacement of handle 62 in a plane perpendicular to the craft fore and aft axis results in angular displacement of gimbal ring 66 about outer trunnions 67—68, such motion being translated by bracket 73 and rod 74 into linear motion of link 75 which produces an angular movement of crank 79 about shaft 80. By virtue of slot 84 and pin 82 crank motion is imparted to shaft 40 to thereby displace rotor 39 relative to stator 38 of the inductive bank device. As a result of such rotor displacement, the resultant magnetic field of stator winding 38 is no longer normal to the electrical axis of rotor winding 39 inducing in the latter a bank potential signal.

At the same time, shaft 40 by means of gear 85, meshing with the outer periphery of gear 86, imparts motion to gear 87 which, due to being locked with shaft 90 through device 89, causes gear 92 to move in unison therewith and to drive gear 96 to move in unison with gear 86. Due to motion in unison of gears 86 and 96, gear 93 has no motion imparted thereto relative to gear 86 but moves with the latter gear thereby causing pin 97 to move in the path of an arc having for its axis the center of gear 86. Angular motion of pin 97 causes a displacement of lever 98 about shaft 100 which through pin 102 and bracket 103 angularly displaces rotor 43 relative to stator windings 42 of inductive rate device 41, whereby the resultant magnetic field of the stator is no longer normal to the electrical axis of rotor winding 43 thus inducing a rate of turn potential in the latter.

A switch 104 consisting of fixed fingers 105 and 106 secured to an insulating block 107 and a current conducting pin 108, carried by an insulating collar 109 which is securely fastened to trunnion 67, is employed to connect the coil 110 of magnetic clutch 17 (Figure 1) with a battery 111 by way of leads 8 and 9. Displacement of gimbal ring 66 about trunnions 67—68, opens switch 104 whereby pin 108 is angularly displaced from fingers 105 and 106 causing contact between the pin and the fingers to be broken whereupon coil 110 of the magnetic clutch is de-energized so that the direction signal from compass 11 is disconnected from the rudder channel of the amplifier during an automatic turn. For a more complete and detailed description of the theory and operation of clutch 17 in the electric automatic pilot reference is made to the aforementioned copending applications.

If it is desired to adjust the airspeed linkage for a cruising or some other speed, it is only necessary to loosen screw 91 from locking device 89 whereby shaft 90 becomes free and may be turned to any desired extent as a result of which gear 96 is displaced relative to gear 86 which is held fast by gear 85 whereupon gear 93 moves along the toothed inner periphery of gear 86 to displace pin 97 relative to slot 99 of lever 98. Such adjustment determines the amount of motion of lever 98 and, therefore, of rotor 43 relative to its stator 42 for a given displacement of handle 62. Pin 97 is normally positioned for cruising speeds substantially as shown in Figure 2 and is moved inwardly for increasing air speeds so that for extremely high speeds little or no displacement is obtained on the part of rotor 43.

The outer ends of handle bracket 63 support a rod 112 therein which normally rests between a pair of fingers 113 and 114 supported at one end of a bracket 115, the opposite end of the bracket being fastened to one end of a shaft 116 loosely sleeved within trunnion 67. The opposite end of shaft 116 engages with a bifurcated portion 117 of a lever 118 pivotally mounted by way of a shaft 119. Rotor supporting shaft 48 of the inductive pitch device 45 is connected to the free end of lever 118 by way of a bracket 120 and a link 121.

The component of the displacement of handle 62 in a plane parallel to the fore and aft axis of the craft provides no movement on the part of gimbal ring 66 but does produce angular displacement of the handle about trunnions 64—65 carrying rod 112 therewith which displaces both bracket 115 and shaft 116 therewith as a result of which lever 118 is displaced about shaft 119 to thereby displace rotor winding 47 relative to its stator 46 whereby the resultant magnetic field of stator 46 is no longer normal to the electrical axis of the rotor inducing a pitch signal potential in the latter.

It will now be readily apparent to those skilled in the art that by operating handle 62, bank, pitch and turn signals are developed in inductive devices 37, 45 and 41 independently of their master instrument, i. e., bank take-off 26, pitch take-off 27, and rate of turn take-off 12 whereby aileron, elevator and rudder surfaces are deflected the proper amount to place the craft in a bank, pitch (climb or dive) and/or turn condition, surface deflection continuing until the follow-back signals of inductive devices 23, 32 and 36 (Figure 1) are equal and opposite to the bank, pitch and turn signals of inductive devices 37, 45 and 41. As the craft condition called for by the movement of the handle 62 is attained, signals are developed by the take-offs 26, 27 and 12 of the artificial horizon and rate gyros to wash out the signals developed by inductive devices 37, 45 and 41. At that point, the follow-back signals of inductive devices 23, 32 and 36 being at a maximum act to reverse operation of motors 19, 30 and 34 to center rudder, aileron and elevator surfaces 10, 24 and 25, the craft remaining in the desired attitude. Should the craft, thereafter, depart from the latter attitude, the master instruments will operate to return the craft to the desired attitude. Once the new attitude or course is attained, the force applied to handle 62 is released therefrom and it is automatically returned to its central or neutral position, centering the rotors of inductive devices 37, 45 and 41 therewith.

Switch 104, which was open when handle 62 was displaced about both of its horizontal axes of freedom, is closed when the handle has returned to its neutral or central position to thereby energize coil 110 (Figure 1) of magnetic clutch 17 whereby compass 11 takes over and maintains control of rudder 10.

One practical embodiment of a control panel for controlling the novel turn mechanism of Figure 2, is shown in Figure 3 and as there illustrated, the housing 56 encloses the entire turn mechanism which is supported by a frame (not shown) arranged within the housing 56, the latter being provided with a series of openings 125 for securing the unit to the craft. The housing 56, moreover, is provided with a threaded disc 126 which, when removed, provides ready access to the free end of airspeed adjustment shaft 90 of Figure 2.

Housing 56 of the controller unit is secured to the craft so that displacement of handle 62 in a direction parallel to the fore and aft axis of the craft develops a pitch signal in the rotor of inductive device 45 while a displacement of the handle 62 in a direction parallel to the transverse axis of the craft develops bank and turn signals in the rotors of inductive devices 37 and 41. A displacement of the handle 62 to the right of the fore and aft axis causes the craft to turn and bank to the right while a displacement of the handle 62 to the left produces a turn and bank to the left. A displacement of the handle 62 forward (parallel with the fore and aft axis) causes the craft to dive while a displacement of the handle 62 rearwardly produces a climb. A displacement of the handle 62 in any direction other than those discussed above, causes the craft to turn, bank and pitch simultaneously, the magnitude and direction of each depending on the magnitude and direction of displacement. To enable the pilot to secure a firm and steady grasp, a pistol type grip 127 (Figure 3) is attached to handle 62, this handle, if desired, being provided with a switch operating button 200. A protective rubber boot 128 joins grip 127 with the top of housing 56.

At its forward end, housing 56 is provided with an opening for accommodating bank trim knob 61 therein which is arranged so that its axis of movement is parallel to the craft fore and aft axis so that displacement of knob 61 to the left imparts a left bank to the craft while a displacement of the knob 61 to the right imparts a right bank to the craft. The knob 61, further, is provided with a marker 129 at its periphery which cooperates with an index 130 located on the housing. When marker 129 is aligned with index 130, stator 38 of the inductive bank device 37 is at an electrical null relative to its rotor 39. Moreover, "L" and "R" designations as shown may be provided to inform the pilot of the direction of the bank trim set in by knob 61 relative to index 130.

Pitch trim knob 53 is so arranged in housing 56 that its axis of rotation is parallel to the transverse axis of the craft so that displacement of knob 53 forwardly imparts a nose down attitude to the craft while displacement of the knob 53 rearwardly imparts a nose up attitude to the craft. In addition to index 54 and fixed marker 55, designations "Down" and "Up" may be provided as shown to inform the pilot of the pitch trim set in by knob 53.

In addition to switch 104 for disconnecting the compass during a turn, the system also includes a power switch 201 in series with a servo clutch switch 202, the latter also being adapted for operation by a pilot's emergency switch 203. The purpose and operation of these various switches being described in greater detail in the aforementioned copending application Serial No. 516,488.

The novel automatic turn control mechanism including the novel compact controller panel arrangement therefor is of such character that extreme flexibility of control is provided by the automatic pilot which makes it possible to execute maneuvers by displacing the handle or grip 127 an appropriate amount in the proper direction. Sharply banked turns may be made by displacement of grip 127, the craft immediately returning to straight flight when the handle or grip is released. Steep climbs and dives may be made by operating pistol grip 127. Bank and pitch trim is immediately available by operation of knobs 61 and 53. Moreover, a combination of turns and climbs or turns and dives may also be executed or the craft quickly thrown from a correctly banked turn in one direction to a correctly banked turn in an opposite direction.

Although but one embodiment of the present invention has been illustrated and described in detail, it is to be expressly understood that the invention is not limited thereto. Various changes may be made in the design and arrangement of the parts without departing from the spirit and scope of the invention as will now be understood by those skilled in the art. For a definition of the limits of the invention reference will be had primarily to the appended claims.

I claim:

1. A control unit for an aircraft automatic steering system having rudder, aileron and elevator actuating motors, said unit comprising displaceable turn, bank and pitch signal developing devices for operating said motors, means operatively connecting said bank signal developing device to said turn signal developing device whereby said turn signal developing device is displaced a predetermined amount for a given amount of movement of said bank signal developing device, a universally mounted manually operable member connected to said pitch and bank signal developing devices for displacing the latter selectively or in unison, and biasing means operative upon termination of manual operation of said member for returning said pitch and bank signal developing devices to a no-signal developing position.

2. A control unit for an aircraft automatic steering system having rudder, aileron and elevator actuating motors, said unit comprising displaceable inductive turn, bank and pitch signal developing devices for operating said motors, airspeed adjustment means operatively connecting said bank signal developing device to said turn signal developing device whereby said turn signal developing device is displaced a predetermined amount for a given amount of movement of said bank signal developing device, a universally mounted manually operable member connected to said pitch and bank signal developing devices for displacing the latter selectively or in unison, and yieldable means operative upon termination of manual operation of said member for returning said pitch and bank signal developing devices to a no-signal developing position.

3. A control unit for an aircraft automatic steering system having rudder, aileron and elevator actuating motors, said unit comprising a casing and displaceable turn, bank and pitch signal developing devices mounted within said casing for operating said motors, air speed adjustment means operatively connecting said bank signal developing device to said turn signal developing device whereby said turn signal developing device is displaced a predetermined amount for a given amount of movement of said bank signal developing device, means comprising a manually operable pistol grip member universally mounted within said casing and connected to said pitch and bank signal developing devices for displacing the latter selectively or in unison, and yieldable means operative upon termination of manual operation of said member for returning said pitch and bank signal developing devices to a no-signal developing position.

4. A control unit for an aircraft automatic steering system having rudder, aileron and elevator actuating motors, said unit comprising a casing and displaceable turn, bank and pitch signal developing devices mounted within said casing for operating said motors, an airspeed adjustment linkage operatively connecting said bank signal developing device to said turn signal developing device whereby said turn signal developing device is displaced a predetermined amount for a given amount of movement of said bank signal developing device, means comprising a manually operable pistol grip member universally mounted within said casing and connected to said pitch and bank signal developing devices for displacing the latter selectively or in unison, yieldable means operative upon termination of manual operation of said member for returning said pitch and bank signal developing devices to a no-signal developing position, and trim means supported on said casing for displacing at least one of said bank and pitch signal developing devices independently of said yieldable means and said pistol grip member.

5. A control unit for an aircraft automatic steering system having rudder and aileron actuating motors, said unit comprising displaceable turn and bank signal developing devices for operating said motors, means operatively connecting said bank signal developing device to said turn signal developing device whereby said turn signal developing device is displaced a predetermined amount for a given amount of movement of said bank signal developing device, a universally mounted manually operable handle connected to said bank signal device for displacing the latter, and biasing means operative upon termination of manual operation of said handle for returning said bank signal developing device to a no-signal developing position.

6. A control unit for an aircraft automatic steering system having rudder and aileron actuating motors, said unit comprising displaceable inductive turn and bank signal developing devices for operating said motors, an airspeed adjustment linkage operatively connecting said bank signal developing device to said turn signal developing device whereby said turn signal developing device is displaced a predetermined amount for a given amount of movement of said bank signal developing device, a universally mounted manually operable member connected to said bank signal device for displacing the latter, and biasing means operative upon termination of manual operation of said member for returning said bank signal developing device to a no-signal developing position.

F. HENRY S. ROSSIRE.

REFERENCES CITED

The following references are of record in the file of this patent:

UNITED STATES PATENTS

| Number | Name | Date |
| --- | --- | --- |
| 1,239,837 | Sperry | Sept. 11, 1917 |
| 1,418,335 | Sperry | June 6, 1922 |
| 2,144,616 | Carlson | Jan. 24, 1939 |
| 2,270,875 | Hanson et al. | Jan. 27, 1942 |
| 2,379,778 | Allen | July 3, 1945 |
| 2,397,475 | Dinza | Apr. 2, 1946 |
| 2,397,978 | Paulus et al. | Apr. 9, 1946 |
| 2,416,097 | Hansen et al. | Feb. 8, 1947 |
| 2,464,629 | Young | Mar. 15, 1949 |
| 2,471,821 | Kutzler et al. | May 31, 1949 |
| 2,516,641 | Murphy | July 25, 1950 |